Patented Aug. 24, 1954

2,687,404

UNITED STATES PATENT OFFICE 2,687,404

EPOXY-CONTAINING COPOLYMERS OF 4-VINYLCYCLOHEXENE MONOEPOXIDE AND A POLYMERIZABLE ETHYLENICALLY UNSATURATED COMPOUND

James A. Robertson, Lewiston, N. Y., assignor to E. I. du Pont de Nemours and Company, Wilmington, Del., a corporation of Delaware No Drawing. Application July 5, 1951, Serial No. 235,377

7 Claims. (Cl. 260—85.7)

This invention relates to a new class of organic polymeric materials. More particularly, it relates to new polymeric compounds containing epoxy groups.

Polymeric epoxides, i. e., polymers containing epoxy groups,

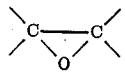

also called oxirane groups, are becoming increasingly important in the chemical industry. These polymers are capable of reacting through their epoxy groups with various reagents such as amines or acids, e. g., phosphoric acid, to give products which, depending upon the reagent and the experimental conditions, may either retain their original linearity or become cross-linked and therefore insoluble and infusible. These modified epoxy polymers are finding important uses in such fields as textile sizing, finishes for metal and other surfaces, treatment of leather and in other applications.

Polymeric epoxides may be obtained through vinyl-type addition polymerization of epoxy monomers containing ethylenic unsaturation, an example of such monomer being allyl glycidyl ether. However, there are very few known monomers containing an epoxy group and a vinyl group.

It is an object of this invention to provide new copolymers. A further object is to provide new copolymers containing epoxy groups. A still further object is to provide new copolymers containing epoxy groups which can be cross-linked through opening of said epoxy groups to give three-dimensional, organic solvent-insoluble materials. Another object is to provide new copolymers which are capable of conversion to alkali-soluble polyphosphates. Other objects will appear hereinafter.

The objects of this invention are accomplished by providing epoxy-containing copolymers of polymerizable ethylenically unsaturated compounds with 4-vinylcyclohexene monoepoxide, a compound having the formula

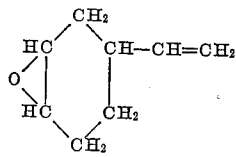

These copolymers are obtained by addition (vinyl-type) polymerization of the monomeric components by means of free radical-producing initiators, leaving the epoxy groups largely or substantially unaffected.

4-vinylcyclohexene monoepoxide is a new compound, which is more particularly described and claimed in co-pending patent application Ser. No. 235,361, filed concurrently herewith by R. E. Foster. 4-vinylcyclohexene monoepoxide is prepared by reacting 4-vinylcyclohexene with a peracid, such as peracetic acid. This converts the "internal" double bond, that is the double bond of the cyclohexene ring, to an oxirane group and leaves the "external" double bond unaffected. The resulting 4-vinylcyclohexene monoepoxide is obtained in good yields as a distillable liquid which can be polymerized or copolymerized by means of free radical-producing catalysts to vinyl polymers containing epoxide groups. If desired, these polymers can be cross-linked by means of acidic catalysts which open the epoxy groups. Conversely, 4-vinylcyclohexene monoepoxide can be first polymerized in the presence of ionic catalysts, e. g., acids, to give polymers of the polyethylene oxide type which do not contain epoxy groups except possibly as end groups, and these polymers can be further polymerized through their vinyl groups.

A typical preparation of 4-vinylcyclohexene monoepoxide is described below.

A reaction vessel was charged with 216 parts (2 moles) of 4-vinylcyclohexene, 1200 parts of benzene and 405 parts of sodium bicarbonate. The mixture was stirred vigorously and was cooled externally until the internal temperature fell to 10° C. To the stirred mixture maintained at 10-15° C. was then added gradually 285 parts of a 40% solution of peracetic acid in acetic acid, amounting to 114 parts (1.5 moles) of peracetic acid, after which the reaction mixture was stirred with cooling for six hours, then poured into 2000 parts of water. The benzene layer was separated, washed once with water, dried over anhydrous magnesium sulfate and distilled under reduced pressure. The various fractions obtained as distillates included 30 parts of unreacted 4-vinylcyclohexene (B. P. 23–25° C. at 14 mm.) and 105.5 parts of 4-vinylcyclohexene monoepoxide (B. P. 49–51° C. at 8–9 mm., $n_D^{25}$ 1.4680). This corresponds to a 57% yield based on the peracetic acid.

*Analysis.*—Calculated for $C_8H_{12}O$: C, 77.37; H, 9.74; O, 12.89. Found: C, 77.7; H, 9.8; oxygen (by oxirane oxygen determination) 12.5.

In addition to analysis, other indications that the compound has the 4-vinylcyclohexene monoepoxide structure are furnished by the method of preparation and by infrared spectra, which show absorptions at three wave lengths characteristic of a terminal unsaturated group. Moreover, the ready copolymerization of the compound with other vinyl or vinylidene monomers, as described in the following examples, also confirms the presence of a vinyl group.

The invention is illustrated in greater detail by the following examples, in which parts are by weight unless otherwise noted. The examples also illustrate an important use of the polymers of this invention, viz., their conversion to alkali-soluble polyphosphates, which are of great technological importance.

*Example I*

A mixture of 90 parts of vinyl acetate, 10 parts of 4-vinylcyclohexene monoepoxide and 4 parts of benzoyl peroxide was heated at refluxing temperature (73–78° C.) for about 3 hours. The highly viscous polymerization mixture was dissolved in 200 parts of acetone, and the polymer was precipitated from this solution by addition of cyclohexane. It was again dissolved in acetone and reprecipitated by addition of petroleum ether. The resulting viscous resin was dissolved in a little benzene and the solvents were evaporated by warming at 50° C. under reduced pressure of 1 to 0.1 mm. of mercury. There was obtained 60 parts of a colorless, brittle solid copolymer of vinyl acetate and 4-vinylcyclohexene monoepoxide. The copolymer contained 0.74% oxirane oxygen, corresponding to a 4-vinylcyclohexene oxide content of 5.7%.

This copolymer was converted to an alkali-soluble polyphosphate as follows: a 15% solution of the above copolymer in dioxane was an equal weight of a 15% solution of orthophosphoric acid in dioxane, and the clear, homogeneous mixture was heated at 75–80° C. for one hour. Upon adding the resulting solution to water, the insoluble polymeric phosphate was precipitated. After washing with water to remove excess phosphoric acid, the purified product was readily soluble in dilute sodium hydroxide and ammonium hydroxide. Films obtained from such solutions by evaporation were clear, colorless, smooth, glossy and hard.

*Example II*

A steel pressure vessel was charged with 20 parts of 4-vinylcyclohexene monoepoxide, 80 parts of vinyl chloride, 200 parts of benzene and 0.5 part of alpha,alpha'-azobisisobutyronitrile, flushed with nitrogen, closed and heated at 60° C. for 18 hours. The reaction mixture was poured into methanol. A solid copolymer of vinyl chloride and 4-vinylcyclohexene monoepoxide precipitated. After filtering and drying under reduced pressure there was obtained 13.5 parts of this copolymer, which contained 0.93% of oxirane oxygen and 52% chlorine, indicating a 4-vinylcyclohexene oxide content of about 7.3%.

*Example III*

A silver lined oscillating pressure vessel was swept with nitrogen, charged with a mixture of 5 parts of 4-vinylcyclohexene monoepoxide, 0.1 part of alpha,alpha'-azobisisobutyronitrile and 100 parts of benzene, again swept with nitrogen and sealed. Ethylene at a pressure of 1000 atmospheres was injected into the vessel which was heated at 75° C. for 4 hours with agitation. After cooling and releasing the pressure, the reaction mixture was discharged, the solvent was removed by heating under reduced pressure and the residue was dried by heating at 72° C. under reduced pressure for about 16 hours. There was obtained 3.8 parts of an ethylene/4-vinylcyclohexene monoepoxide copolymer free from cross-linking, as shown by its ready solubility in benzene. This polymer contained (average of three determinations) 80.94% carbon, 13.37% hydrogen and 0.80% oxirane oxygen, corresponding to 6.2% by weight of polymerized 4-vinylcyclohexene monoepoxide in the copolymer. The analytical data are consistent with the view that the original copolymer contained a much larger amount of 4-vinylcyclohexene monoepoxide which was partly hydrolyzed by adventitious moisture during the subsequent operations. Thus, the copolymer can be viewed as containing, by weight, 72.05% of polymerized ethylene, 25.2% of 4-vinylcyclohexene monoepoxide and 2.75% of water, the latter being present in combined form as polymerized 1-vinyl-3,4-cyclohexene glycol. Such a copolymer has the calculated composition: C, 81.4%; H, 13.07%; oxirane oxygen 0.80%.

The copolymers of this invention are prepared by polymerizing the monomeric components with the help of free radical-producing initiators such as the inorganic and organic peroxides, e. g., hydrogen peroxide, benzoyl peroxide, tert. butyl hydroperoxide, lauroyl peroxide, and the recently developed azonitrile initiators of U. S. Patent 2,471,959. Polymerization may be also initiated by ultraviolet light irradiation in the presence of photopolymerization catalysts such as uranyl nitrate, benzoin and the like. With free radical-producing initiators, as opposed to ionic catalysts such as acidic or alkaline materials, polymerization takes place solely or preponderantly through the vinyl groups, leaving the epoxy groups, or at least a substantial portion of them, intact. Thus, the copolymers of this invention contain, as a repeating unit, the 3,4-cyclohexene-oxyethylene group,

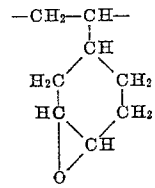

If desired, these copolymers can be cross-linked through opening of the epoxy groups to give three-dimensional, organic solvent-insoluble materials. This can be done by aftertreatment of the copolymer with small amounts of an ionic catalyst such as zinc chloride, ferric chloride, boron trifluoride, p-toluenesulfonic acid, hydrochloric acid, sulfuric acid, perchloric acid, phosphoric acid, sodium hydroxide, alkali metal alkoxides, quaternary ammonium hydroxides, and the like.

Copolymers of 4-vinylcyclohexene monoepoxide can be prepared with any other polymerizable ethylenically unsaturated compound, and particularly with vinyl and vinylidene compounds, i. e., compounds having a terminal methylene, $H_2C=$, group attached by a double bond to the adjacent carbon. Examples of such polymerizable ethylenically unsaturated epoxy-free compounds are the vinyl and vinylidene halides such as vinyl fluoride, vinyl bromide, vinyl iodide, 1,1-di-fluoroethylene, 1,1-dichloroethylene; vinyl and vinylidene hydrocarbons such as isobutylene, 1,3-butadiene, styrene; halovinyl and halovinylidene hydrocarbons such as 2-fluoro-1,3-butadiene, 2-chloro-1,3-butadiene, 2,3-dichloro-1,3-butadiene; acrylic, haloacrylic and alkacrylic acids, esters, nitriles and amides such as acrylic acid, methacrylic acid, alpha-chloroacrylic acid, ethyl acrylate, methyl methacrylate, butyl methacrylate, methoxymethyl methacrylate, chloroethyl methacrylate, beta-diethylaminoethyl methacrylate, acrylonitrile, methacrylonitrile, acrylamide, methacrylamide; vinyl carboxylates such as vinyl formate, vinyl chloroacetate, vinyl butyrate, vinyl laurate; unsaturated aldehydes and ketones such as acrolein, methacrolein, methyl vinyl ketone; N-vinyl imides such as N-vinylphthalimide, N-vinylsuccinimide; unsaturated ethers such as vinyl ethyl ether, 2-phenoxy-1,3-butadiene; other vinyl monomers such as vinylpyridine, N-vinylcaprolactam; and other polymerizable or copolymerizable unsaturates such as tetrafluoroethylene, diethyl fumarate, dimethyl maleate and the like. Two or more vinyl or vinylidene monomers may be copolymerized with the 4-vinylcyclohexene monoepoxide.

The most generally useful copolymers are those in which the component copolymerized with 4-vinylcyclohexene monoepoxide is a vinyl ester, particularly a vinyl halide or a vinyl ester of an alkanoic monocarboxylic acid of one to four carbon atoms, or an aliphatically unsaturated hydrocarbon having a terminal methylene group, particularly a monounsaturated hydrocarbon of two to eight carbon atoms.

In order to possess the advantages caused by the presence of epoxy groups, the copolymers should contain at least 3% by weight of 4-vinylcyclohexene monoepoxide, and preferably at least 5%. Since 4-vinylcyclohexene monoepoxide polymerizes relatively slowly as compared with other vinyl or vinylidene monomers, it is in general difficult to prepare copolymers containing more than 75% by weight of polymerized 4-vinylcyclohexene monoepoxide, and the most useful materials for economic and technical reasons are those containing, by weight, between 3% and 50%, and still more preferably between 5% and 25%, of polymerized 4-vinylcyclohexene monoepoxide. The copolymers thus contain, in addition to 4-vinylcyclohexene monoepoxide, from 97% to 25% by weight of one or more other polymerizable ethylenically unsaturated monomers.

The copolymers of this invention vary in physical appearance from viscous oils to high melting solids, depending upon the nature and amount of the monomer copolymerized with 4-vinylcyclohexene monoepoxide and upon the molecular weight of the final product.

The polymerization conditions are not critical. In general, there is used between 0.01 and 5% of the free radical-producing initiator by weight of the total polymerizable materials. Any desired relative proportions of the polymerizable monomers can be used, a generally useful range being between 5% and 90% of 4-vinylcyclohexene monoepoxide based on the total weight of polymerizable monomers. Polymerization can be carried out in the bulk, i. e., without added diluent, or in an inert, unpolymerizable organic solvent which may or may not be a solvent for the copolymer, e. g., the ethylenically saturated aliphatic, cycloaliphatic or aromatic hydrocarbons such as n-hexane, cyclohexane, toluene, the xylenes and the like. With active initiators, the polymerization temperature can be as low as 0° C. or even lower, or it can be as high as the decomposition point of the reactants, a generally suitable range being between 20 and 150° C. Superatmospheric pressure can be used, and is desirably used with gaseous comonomers, such pressures varying between 1 atmosphere and the maximum pressure the equipment can withstand, a useful range being between 2 and 1500 atmospheres. The pressure can be produced by the pressure, either autogenous or superimposed, of the gaseous monomers at the reaction temperature or it can be that produced by an extraneous, inert gas such as nitrogen, air or carbon dioxide.

The copolymers of 4-vinylcyclohexene monoepoxide, in addition to the uses already mentioned, have the general usefulness of resinous materials in coating, impregnating or molding compositions, with the further advantage that they are capable of being cross-linked to insoluble, water- and solvent-resistant products.

As many apparently widely different embodiments of this invention may be made without departing from the spirit and scope thereof, it is to be understood that this invention is not limited to the specific embodiments thereof except as defined in the appended claims.

I claim:

1. An epoxy-containing copolymer of 4-vinylcyclohexene monoepoxide and at least one polymerizable ethylenically unsaturated epoxy-free compound, said copolymer containing from 3 to 75% by weight of said 4-vinylcyclohexene monoepoxide polymerized through the vinyl group and retaining the epoxide group intact.

2. An epoxy-containing copolymer of 4-vinylcyclohexene monoepoxide and a polymerizable epoxy-free vinyl monomer, said copolymer containing from 3 to 50% by weight of said 4-vinylcyclohexene monoepoxide polymerized through the vinyl group and retaining the epoxide group intact.

3. An epoxy-containing copolymer of 4-vinylcyclohexene monoepoxide and a polymerizable epoxy-free vinyl ester, said copolymer containing from 3 to 50% by weight of said 4-vinylcyclohexene monoepoxide polymerized through the vinyl group and retaining the epoxide group intact.

4. An epoxy-containing copolymer of 4-vinylcyclohexene monoepoxide and a polymerizable epoxy-free vinyl ester of an alkanoic monocarboxylic acid, said copolymer containing from 3 to 50% by weight or said 4-vinylcyclohexene monoepoxide polymerized through the vinyl group and retaining the epoxide group intact.

5. An epoxy-containing copolymer of 4-vinylcyclohexene monoepoxide with a polymerizable epoxy-free vinyl halide, said copolymer containing from 3 to 50% by weight of said 4-vinylcyclohexene monoepoxide polymerized through the vinyl group and retaining the epoxide group intact.

6. An epoxy-containing copolymer of 4-vinylcyclohexene monoepoxide with vinyl acetate, said copolymer containing from 3 to 50% by weight of said 4-vinylcyclohexene monoepoxide polymerized through the vinyl group and retaining the epoxide group intact.

7. An epoxy-containing copolymer of 4-vinylcyclohexene monoepoxide with vinyl chloride, said copolymer containing from 3 to 50% by weight of said 4-vinylcyclohexene monoepoxide polymerized through the vinyl group and retaining the epoxide group intact.

References Cited in the file of this patent

UNITED STATES PATENTS

| Number | Name | Date |
|---|---|---|
| 2,152,003 | Van Peski et al. | Mar. 28, 1939 |
| 2,160,943 | Britton et al. | June 6, 1939 |